United States Patent [19]
Barton

[11] Patent Number: 5,607,184
[45] Date of Patent: Mar. 4, 1997

[54] ADJUSTABLE STEERING COLUMN

[75] Inventor: Laurence G. H. Barton, Leamington, England

[73] Assignee: The Torrington Company, Torrington, Conn.

[21] Appl. No.: 558,101

[22] Filed: Nov. 15, 1995

[30] Foreign Application Priority Data

Nov. 24, 1994 [GB] United Kingdom ............... 9423766

[51] Int. Cl.$^6$ ..................................................... B62D 1/18
[52] U.S. Cl. ............................................. 280/775; 74/493
[58] Field of Search .................................. 280/775, 779, 280/780; 74/493, 492

[56] References Cited

U.S. PATENT DOCUMENTS

| 4,257,624 | 3/1981 | Hansen | 280/775 |
| 4,541,298 | 9/1985 | Strutt | 280/775 |
| 5,161,425 | 11/1992 | Baskett et al. | 74/493 |

FOREIGN PATENT DOCUMENTS

| 0341078 | 11/1989 | European Pat. Off. |  |
| 0600700A1 | 6/1994 | European Pat. Off. |  |
| 1094121 | 12/1960 | Germany. |  |
| 61-77564 | 4/1986 | Japan | 74/493 |
| 2-258471 | 10/1990 | Japan | 280/775 |
| 537880 | 1/1977 | U.S.S.R. | 74/493 |
| 2245663 | 1/1992 | United Kingdom | 280/779 |

*Primary Examiner*—Brian L. Johnson
*Assistant Examiner*—Peter C. English
*Attorney, Agent, or Firm*—Michael H. Minns

[57] ABSTRACT

An adjustable steering column construction in which a steering shaft is mounted within a column tube; a bracket having bracket members secures the tube to a vehicle; adjustment between tube and bracket is provided by slots preferably in antifriction elements; a clamping arrangement is provided which has a central clamping axis A which intersects the steering shaft axis B so that the clamping force to secure the tube relative to the bracket acts through the intersection resulting in a reduction of the downward extension of the construction including a clamping handle which preferably extends under the column tube.

4 Claims, 3 Drawing Sheets

5,607,184

ADJUSTABLE STEERING COLUMN

BACKGROUND OF THE INVENTION

The present invention relates to an adjustable steering column for a vehicle and to a clamping mechanism for use with such an adjustable steering column.

It is known from co-pending U.S. patent application Ser. No. 08/263,857, filed Jun. 22, 1994 to provide a clamping mechanism for a steering column in which bracket members extend from a column mounting and further bracket members extend from the column to a bolt which can be loosened to allow adjustment between the brackets. The bolt extends between the brackets below the column so that the clamping force between the bracket members is even. This arrangement, however, has the disadvantage that the bracket members and associated parts extend into an area where space above the driver's knees is at a premium.

The foregoing illustrates limitations known to exist in present adjustable steering columns. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an adjustable steering column in which a steering shaft is mounted within an outer column tube, comprising: a bracket for securing the column tube to a vehicle; bracket members extending from the bracket either side of the column tube, relative adjustment between the bracket and column tube being provided by means of longitudinal slots; and clamping means extending between the bracket members to clamp the tube to the bracket, the clamping means has a central clamping axis which intersects the steering shaft axis.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Accordingly, the present invention comprises an adjustable steering column in which a steering shaft is mounted within an outer column tube, and comprising a bracket for securing the column tube to a vehicle, bracket members extending from the bracket either side of the column tube, relative adjustment between the bracket and the column tube being provided by means of longitudinal slots, clamping means extending between the bracket members to clamp the tube to the bracket characterized in that the clamping means has a central clamping axis which intersects the steering shaft axis.

By moving the clamping axis from below the steering shaft axis to that of steering shaft axis it is possible to provide more room for the driver. Preferably the clamping means is formed with a central portion which surrounds the steering shaft. The column tube may have flattened sides with longitudinal apertures to receive antifriction elements enabling linear adjustment of the column tube relative the column bracket. These elements may have soft stops at each end formed as shown in my copending British Patent Application No. 9423187.5 filed on Nov. 17, 1994 and corresponding U.S. patent application Ser. No. 08/559,787 filed Nov. 15, 1995. The clamping means hereafter referred to as a yoke alternatively may have soft stops formed as resilient inserts on each side to abut at each end of linear slots of the antifriction elements mounted to the column tube.

The yoke preferably has extensions horizontally on each side in a direction at right angles to the steering shaft which extensions pass through further antifriction elements which are slotted to allow vertical adjustment of the column tube and steering shaft, the further antifriction elements being carried in the bracket members of the bracket. One said extension from the yoke may be arranged to carry a clamping device actuated by a clamping handle arranged to clamp the yoke to the bracket members. The clamping handle preferably extends from said one extension to below the column tube.

Figure 2:
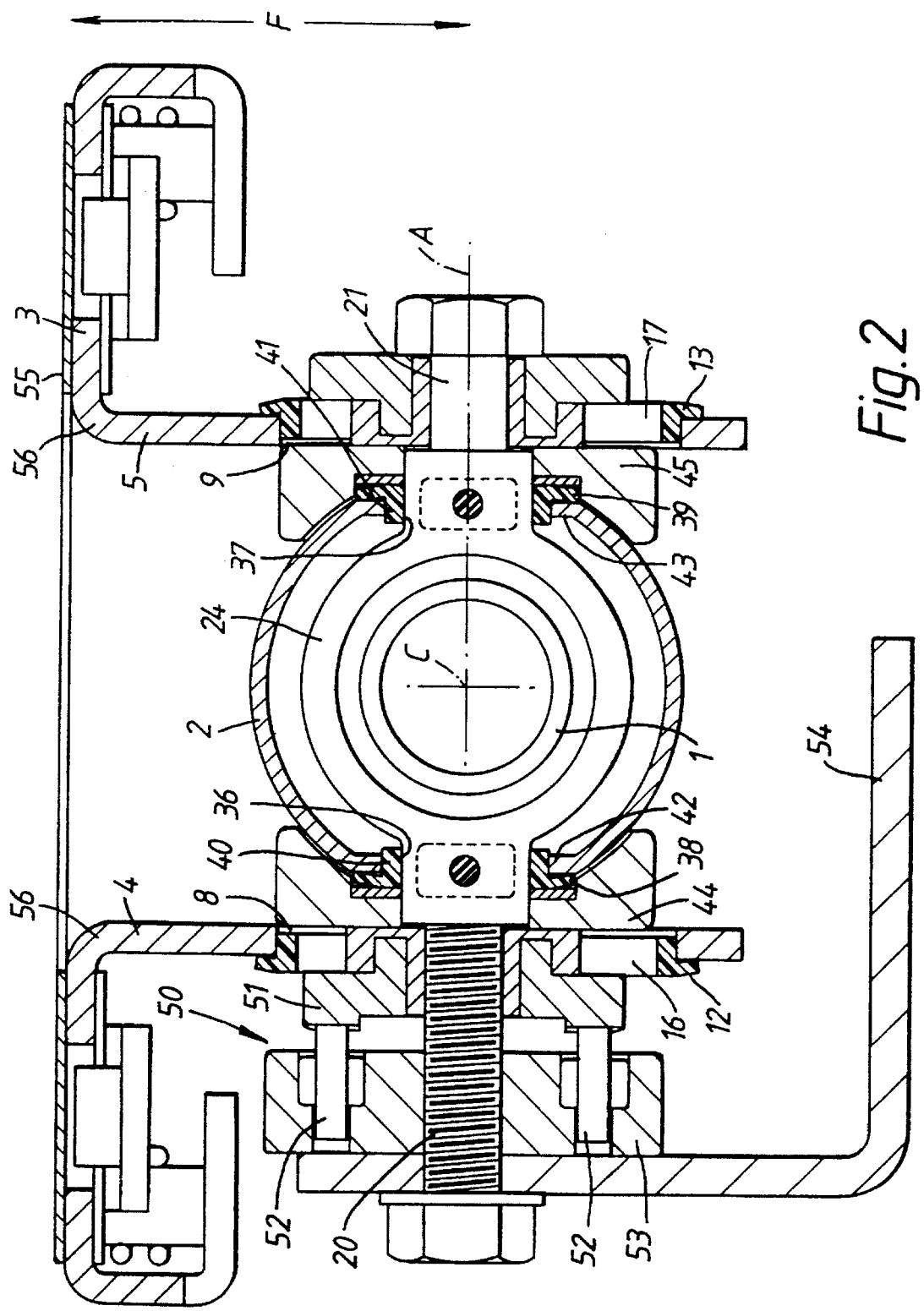
FIG. 2 is a cross sectional view of the adjustable steering column of FIG. 1 taken on II—II of FIG. 1.
Figure 3:
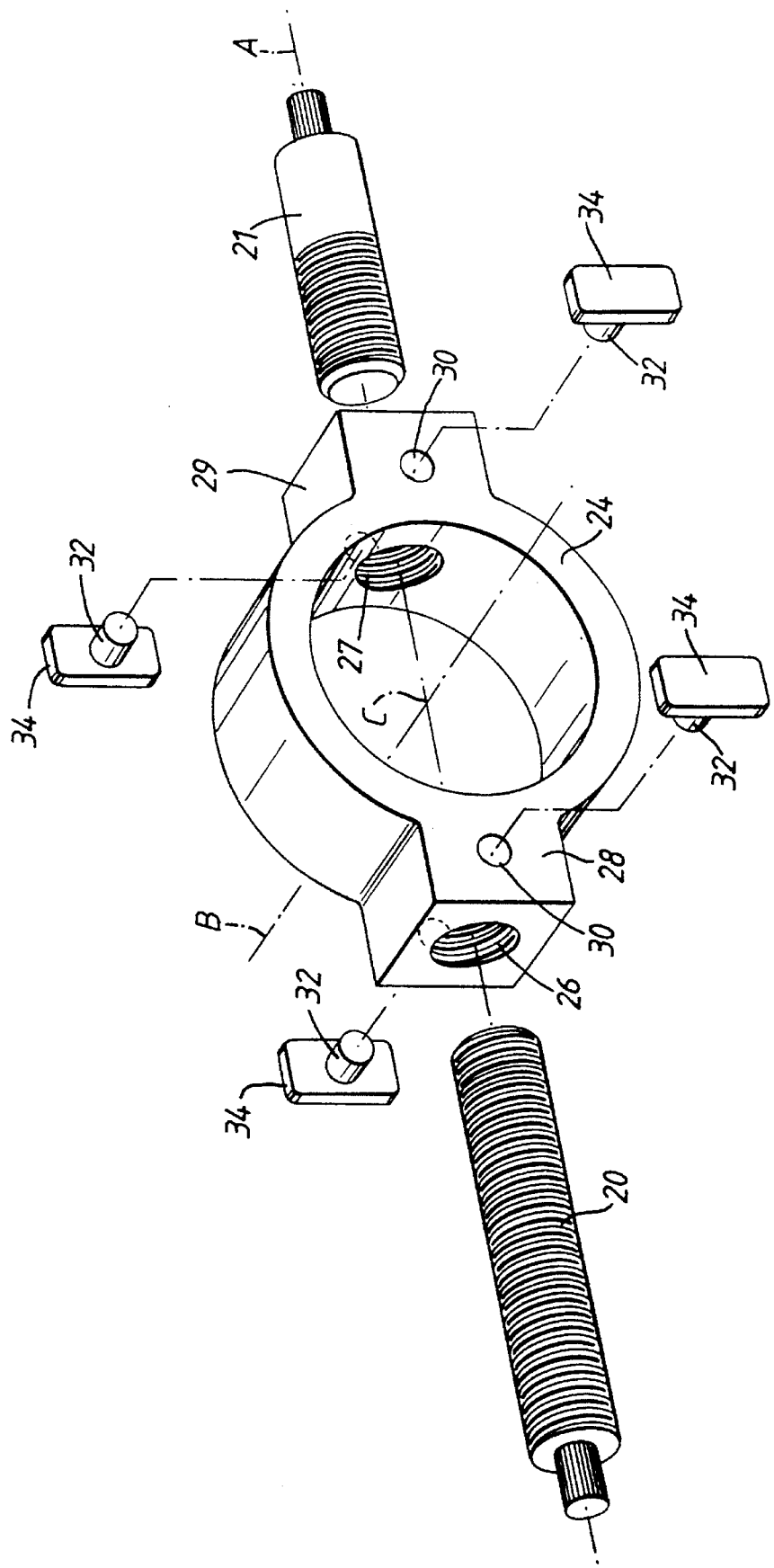
FIG. 3 is a perspective view of a yoke member forming part of the clamping mechanism.

In FIG. 2, there is shown a steering shaft 1 mounted within an outer column tube 2. Tube 2 is supported by a bracket 3 which secures the column tube 2 to a vehicle. Bracket members 4 and 5 extend from the bracket 3 either side of the column tube to vertical slots 8 and 9 respectively in which are located antifriction elements 12 and 13 which are similar to those shown in my copending British Patent Application No. 9423187.5 and corresponding U.S. patent application Ser. No. 08/559,787 filed Nov. 15, 1995. These elements 12 and 13 have longitudinal slots 16 and 17 which receive horizontal studs 20 and 21 aligned in a central clamping axis A which intersects the steering shaft axis B at point C. The studs 20 and 21 form part of a clamping means similar to that shown in U.S. Pat. No. 5,377,555. A further part of the clamping means is a central portion formed as a yoke 24 which surrounds the steering shaft 1. Studs 20, 21 are screwed into threaded holes 26 and 27 in extending portions 28 and 29 of the yoke, so that the studs form extensions to the yoke in the horizontal direction along axis A at right angles to the steering shaft axis B. Holes 30 either side of each extending portion 28, 29 aligned parallel to axis B are arranged to receive a protrusion 32 from each of four rubber or elastomer stops 34 which act as buffer stops to cushion the yoke as it slides either way in the axial direction B in linear longitudinal slots 36 and 37 in linear antifriction elements 38 and 39 which are similar to but longer than elements 12 and 13. Elements 38 and 39 are located in linear longitudinal apertures 40 and 41 respectively in flattened sides 42 and 43 of the column tube 2. Packing members 44 and 45 are provided between bracket members 4 and 5 and the column tube 2.

Figure 1:
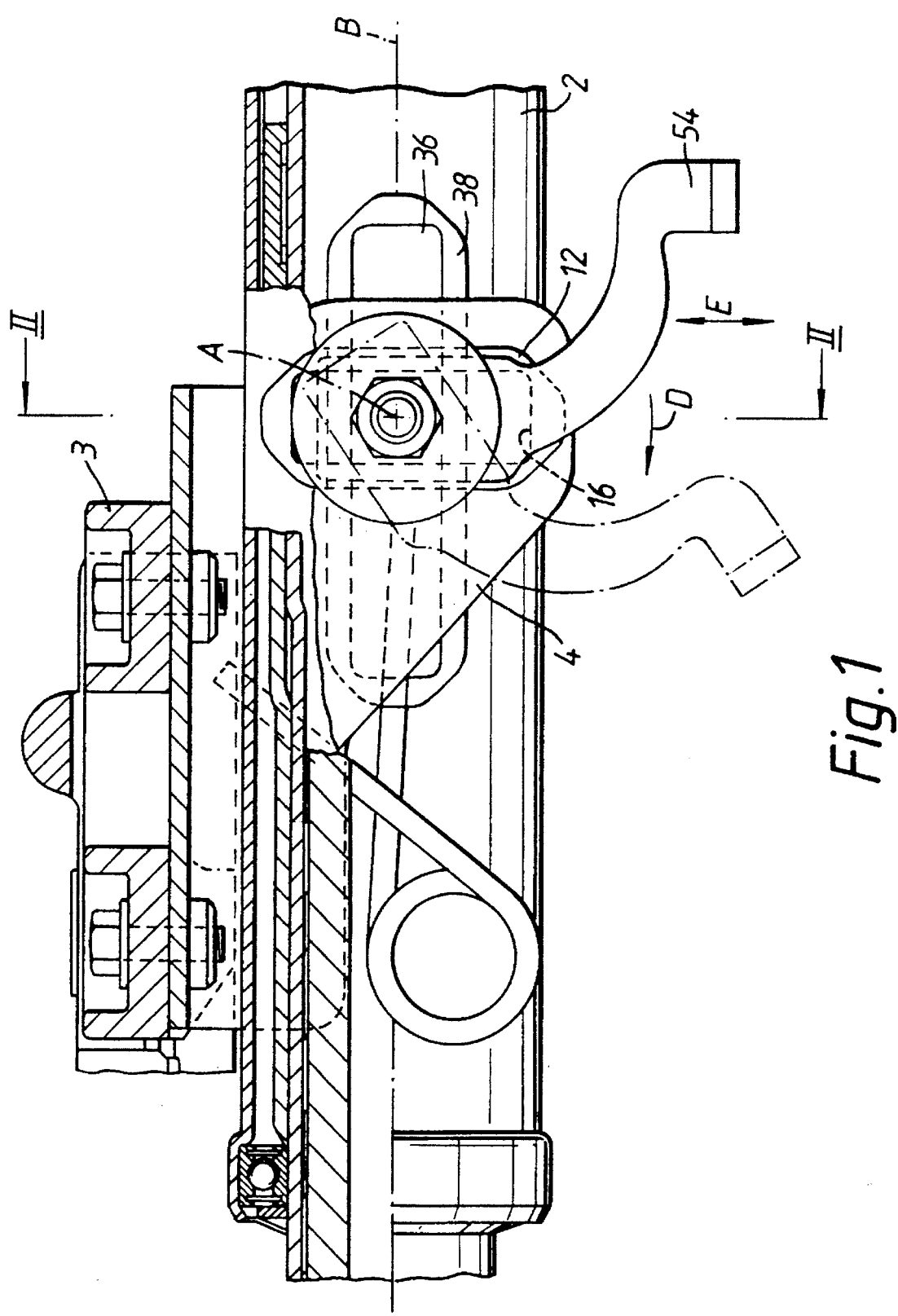
FIG. 1 is a part sectional side view of a part of an adjustable steering column for a vehicle including a clamping mechanism according to the invention.

The clamping means further comprises a cam means 50 in the form of a cam 51 and two or more rollers 52 mounted in a roller housing 53 to which a clamping handle 54 is fixed. This arrangement is as described in U.S. Pat. No. 5,377,555 and functions in the same way so that movement of handle 54 in direction D (see FIG. 1) causes an unclamping action to allow column tube 2 to be adjusted linearly in direction B or for rake in a direction E which although is angled to the vertical will be called vertical for the purposes of this description.

While the yoke 24 surrounds shaft 1, it is possible to construct the yoke without an upper or a lower portion while still maintaining its axial extensions that is the studs 20, 21 in axis A.

It will therefore be seen that when compared with earlier steering column clamps, the bracket members 4,5 and handle 54 of the invention extend downwards from the steering shaft axis B substantially less and therefore allow more leg room under the steering column. Furthermore, since the clamping force on bracket members 4,5 is applied at a reduced distance F between the upper extent 55 of the bracket 3 as compared with the prior art there is less stress at points 56 where the bracket members turn from their horizontal portions to their vertical portions.

Having described the invention, what is claimed is:

1. An adjustable steering column in which a steering shaft is mounted within an outer column tube, comprising:

a bracket for securing the outer column tube to a vehicle;

bracket members extending from the bracket on opposite sides of the column tube, relative adjustment between the bracket and column tube being provided by means of longitudinal slots; and clamping means extending between the bracket members to clamp the tube to the bracket, the clamping means has a central clamping axis which intersects a longitudinal axis of the steering shaft, the clamping means being formed with a central portion which surrounds at least part of the steering shaft, wherein said opposite sides of the column tube are flattened sides with longitudinal apertures which receive antifriction elements which in turn receive extensions from said central portion.

2. An adjustable steering column according to claim 1, wherein the central portion completely surrounds the steering shaft.

3. An adjustable steering column in which a steering shaft is mounted within an outer column tube, comprising:

a bracket for securing the outer column tube to a vehicle;

bracket members extending from the bracket on opposite sides of the column tube, relative adjustment between the bracket and column tube being provided by means of longitudinal slots; and clamping means extending between the bracket members to clamp the tube to the bracket, the clamping means has a central clamping axis which intersects a longitudinal axis of the steering shaft, the clamping means being formed with a central portion which surrounds at least part of the steering shaft, wherein the central portion has an extending portion on each of a pair of opposite sides extending horizontally from the central portion and wherein resilient stops are provided on opposite sides of each extending portion in a direction parallel to the axis of the steering shaft.

4. An adjustable steering column according to claim 3, wherein the central portion completely surrounds the steering shaft.

* * * * *